(12) United States Patent
Rhodes

(10) Patent No.: US 9,216,698 B2
(45) Date of Patent: Dec. 22, 2015

(54) AUXILIARY STORAGE SYSTEM

(71) Applicant: Nashco Enterprises Ltd., Stratford (CA)

(72) Inventor: Ryan Lorne Rhodes, Stratford (CA)

(73) Assignee: Nashco Enterprises Ltd., Stratford, ON (CA)

( * ) Notice: Subject to any disclaimer, the term of this patent is extended or adjusted under 35 U.S.C. 154(b) by 0 days.

(21) Appl. No.: 14/311,701

(22) Filed: Jun. 23, 2014

(65) Prior Publication Data

US 2014/0375040 A1 Dec. 25, 2014

Related U.S. Application Data

(60) Provisional application No. 61/837,925, filed on Jun. 21, 2013.

(51) Int. Cl.
*B60R 9/06* (2006.01)

(52) U.S. Cl.
CPC ...................... *B60R 9/065* (2013.01)

(58) Field of Classification Search
CPC .................. B60R 9/06; B60R 9/065
See application file for complete search history.

(56) References Cited

U.S. PATENT DOCUMENTS

| | | | | |
|---|---|---|---|---|
| 4,084,736 A | * | 4/1978 | Jacobs, Jr. ................... | 414/462 |
| 4,297,069 A | * | 10/1981 | Worthington ............... | 414/462 |
| 4,593,840 A | * | 6/1986 | Chown ......................... | 224/520 |
| 4,844,528 A | * | 7/1989 | Johnson ...................... | 296/37.1 |
| 5,011,361 A | * | 4/1991 | Peterson ..................... | 414/462 |
| 5,029,740 A | * | 7/1991 | Cox .............................. | 224/484 |
| 5,456,564 A | * | 10/1995 | Bianchini .................... | 414/462 |
| 5,460,304 A | * | 10/1995 | Porter et al. ................ | 224/521 |
| 5,482,424 A | * | 1/1996 | Jones et al. ................. | 414/462 |
| 5,489,110 A | * | 2/1996 | Van Dusen ................. | 280/415.1 |
| 5,664,717 A | * | 9/1997 | Joder ........................... | 224/502 |
| 5,775,560 A | * | 7/1998 | Zahn et al. ................... | 224/524 |
| 5,881,937 A | * | 3/1999 | Sadler ......................... | 224/509 |
| 5,984,613 A | * | 11/1999 | Motilewa .................... | 414/462 |
| 6,095,349 A | * | 8/2000 | O'Meara ..................... | 212/180 |
| 6,129,371 A | * | 10/2000 | Powell ......................... | 280/461.1 |
| 6,152,341 A | * | 11/2000 | LeMay et al. ............... | 224/509 |
| 6,260,752 B1 | * | 7/2001 | Dollesin ...................... | 224/524 |
| 6,293,451 B1 | * | 9/2001 | LeMay et al. ............... | 224/509 |
| 6,361,264 B1 | * | 3/2002 | Guthrie et al. .............. | 414/462 |
| 6,471,104 B1 | | 10/2002 | Janek | |
| 6,502,730 B2 | * | 1/2003 | Johnson ...................... | 224/519 |
| 6,517,134 B2 | * | 2/2003 | Armstrong .................. | 296/3 |
| 6,524,054 B2 | * | 2/2003 | Maney ......................... | 414/462 |
| 6,595,398 B2 | * | 7/2003 | Himel, Jr. ................... | 224/495 |
| 6,612,615 B1 | * | 9/2003 | Dimand ...................... | 280/769 |
| 6,655,895 B1 | * | 12/2003 | Dahl ............................ | 414/462 |

(Continued)

*Primary Examiner* — Hau Phan
*Assistant Examiner* — Jacob Meyer

(57) ABSTRACT

An auxiliary storage system for attachment to a vehicle, including a storage container and a hitch assembly for releasably connecting the storage container and the vehicle together. The hitch assembly includes a central body, a first connection subassembly for attaching the central body and the vehicle together, and a second connection subassembly connectable with the storage container and movable relative to the central body, for attaching the central body and the storage container together. When the second connection subassembly is connected with the storage container, the storage container is movable thereby between a raised position, in which the storage container is located above a ground surface, and a lowered position, in which the storage container is located on the ground surface.

13 Claims, 13 Drawing Sheets

(56) References Cited

U.S. PATENT DOCUMENTS

| | | | |
|---|---|---|---|
| 6,802,441 B1 * | 10/2004 | DuRant et al. | 224/513 |
| 6,846,017 B2 * | 1/2005 | Martin | 280/769 |
| 7,188,856 B2 * | 3/2007 | Maynard | 280/402 |
| RE39,646 E * | 5/2007 | Dehl | 414/462 |
| 7,249,771 B1 * | 7/2007 | Brennan et al. | 280/35 |
| 7,380,803 B2 | 6/2008 | Thomas | |
| 7,641,235 B1 * | 1/2010 | Anduss | 280/769 |
| 7,861,903 B2 * | 1/2011 | Plaschka | 224/402 |
| 8,061,572 B2 * | 11/2011 | Myrex | 224/502 |
| 8,132,997 B2 * | 3/2012 | Reuille et al. | 414/462 |
| 8,327,979 B2 * | 12/2012 | Lynch et al. | 187/242 |
| 8,505,932 B1 | 8/2013 | Piccirillo | |
| 8,590,758 B2 * | 11/2013 | Gray | 224/532 |
| 8,783,536 B1 * | 7/2014 | Julian | 224/495 |
| 9,017,002 B1 * | 4/2015 | Joynt | 414/462 |
| 2002/0172581 A1 * | 11/2002 | Maney | 414/462 |
| 2003/0057243 A1 * | 3/2003 | Himel, Jr. | 224/519 |
| 2003/0099531 A1 * | 5/2003 | Williams | 414/462 |
| 2003/0168487 A1 * | 9/2003 | Lane et al. | 224/499 |
| 2004/0173654 A1 * | 9/2004 | McAlister | 224/519 |
| 2006/0145461 A1 | 7/2006 | Anderson | |
| 2008/0100076 A1 * | 5/2008 | Potts | 296/3 |
| 2008/0128463 A1 * | 6/2008 | Bryan | 224/486 |
| 2008/0231029 A1 * | 9/2008 | Hummel | 280/769 |
| 2009/0152314 A1 * | 6/2009 | Myrex | 224/502 |
| 2009/0159627 A1 * | 6/2009 | Myrex | 224/495 |
| 2010/0066069 A1 * | 3/2010 | Bradshaw | 280/769 |
| 2012/0168480 A1 * | 7/2012 | Gray | 224/519 |
| 2012/0305612 A1 * | 12/2012 | Bell, Jr. | 224/519 |

* cited by examiner

AUXILIARY STORAGE SYSTEM

This application claims the benefit of U.S. Provisional Patent Application No. 61/837,925, filed Jun. 21, 2013, and incorporates such provisional patent application in its entirety by reference.

FIELD OF THE INVENTION

The present invention is an auxiliary storage system for attachment to a vehicle.

BACKGROUND OF THE INVENTION

Various storage containers are known that are mounted to a vehicle (e.g., an automobile) to provide additional storage capacity. For instance, containers that are mountable on the roof of an automobile are well known in the art. These containers may provide additional storage for luggage, for example, in connection with a relatively long trip.

However, the known storage containers have a number of disadvantages. For instance, containers that are mounted on the roof are difficult to access, and accessing them (once loaded) tends to be awkward. Also, the roof-mounted container adversely affects the aerodynamic performance of the automobile.

SUMMARY OF THE INVENTION

There is a need for an auxiliary storage system that overcomes or mitigates one or more of the disadvantages or defects of the prior art. Such disadvantages or defects are not necessarily included in those described above.

In its broad aspect, the invention provides an auxiliary storage system for attachment to a vehicle. The auxiliary storage system includes a storage container and a hitch assembly for releasably connecting the storage container and the vehicle together. The hitch assembly includes a central body, a first connection subassembly for attaching the central body and the vehicle together, and a second connection subassembly connectable with the storage container and movable relative to the central body, for attaching the central body and the storage container together. When the second connection subassembly is connected with the storage container, the storage container is movable thereby between a raised position, in which the storage container is located above a ground surface, and a lowered position, in which the storage container is located on the ground surface.

In one aspect, the hitch assembly additionally includes an adjustment subassembly for adjusting the position of the central body when it is attached to the vehicle, so that the central body positions the second connection subassembly to move the storage container substantially vertically between the lowered and raised positions.

In another aspect, the second connection subassembly includes a jack element mounted in a rear column of the central body, and movable by a motion device relative to the central body, one or more upper engagement portions, and one or more middle engagement portions. Each of the upper engagement portion and the middle engagement portion are mounted to the jack element and engageable with the storage container for moving the storage container between the raised and lowered positions.

In yet another aspect, the central body additionally includes one or more lower engagement portions mounted on the central body and engageable with the storage container when the storage container is in the raised position.

In another of its aspects, the storage container includes one or more upper engagement elements, configured for engagement with the upper engagement portion.

In yet another aspect, the storage container includes one or more middle engagement elements positioned for engagement with the middle engagement portion when the storage container is in the raised position. When the storage container is in the raised position, the middle engagement portion and the middle engagement element cooperate to position the storage container substantially vertically.

In another aspect, the adjustment subassembly includes an adjustment plate having rear and front adjustment plate holes therein. The adjustment plate is positionable adjacent to a selected part of the central body which has respective rear and front central body holes therein, for alignment of the rear adjustment plate hole and the front adjustment plate hole substantially with the rear and front central body holes respectively. The adjustment subassembly also includes a bolt positionable in the rear adjustment plate hole and the rear central body hole, the rear adjustment plate hole being substantially larger than the bolt, to permit movement of the central body relative to the adjustment plate. In addition, the adjustment subassembly also includes a pin positionable in the front adjustment plate hole and the front central body hole. The front central body hole is substantially larger than the pin, to permit movement of the central body relative to the adjustment plate. Also, the adjustment subassembly includes an eccentric washer movable by rotation of an adjustment bolt. T eccentric washer is engaged with the central body and at least partially engaged with the adjustment plate so that rotation of the eccentric washer causes corresponding pivoting movement of the central body relative to the adjustment plate, for positioning a rear column of the central body substantially vertically.

In another aspect, the first connection subassembly includes a connector securable to the vehicle. The connector includes a main part receivable in a front column of the central body. An upper region of the main part is attached to the first column by a pin. The central body is pivotable about the pin in response to the rotation of the eccentric washer.

In yet another aspect, the storage container additionally includes a lower engagement element positioned below the middle engagement element. The lower engagement portion is formed for engagement with the lower engagement element when the storage container is in the raised position, so that the storage container is at least partially stabilized by the engagement portion.

In another of its aspects, the invention provides a method of attaching an auxiliary storage system to a vehicle. The method includes the steps of providing a storage container, providing a central body, and providing a first connection subassembly for attaching the vehicle and the central body together. With the first connection subassembly, the central body and the trailer hitch are attached together. A second connection subassembly for attaching the central body and the storage container together is provided. With the second connection subassembly, the central body and the storage container are attached together. A motion device is provided for moving the second connection subassembly relative to the central body, to move the storage container between a raised position, in which the storage container is positioned above a ground surface, and a lowered position, in which the storage container is positioned on the ground surface. The motion device is used to move the second connection subassembly relative to the central body, to move the storage container between the raised and lowered positions.

BRIEF DESCRIPTION OF THE DRAWINGS

The invention will be better understood with reference to the attached drawings, in which.

DETAILED DESCRIPTION

Figure 1A:
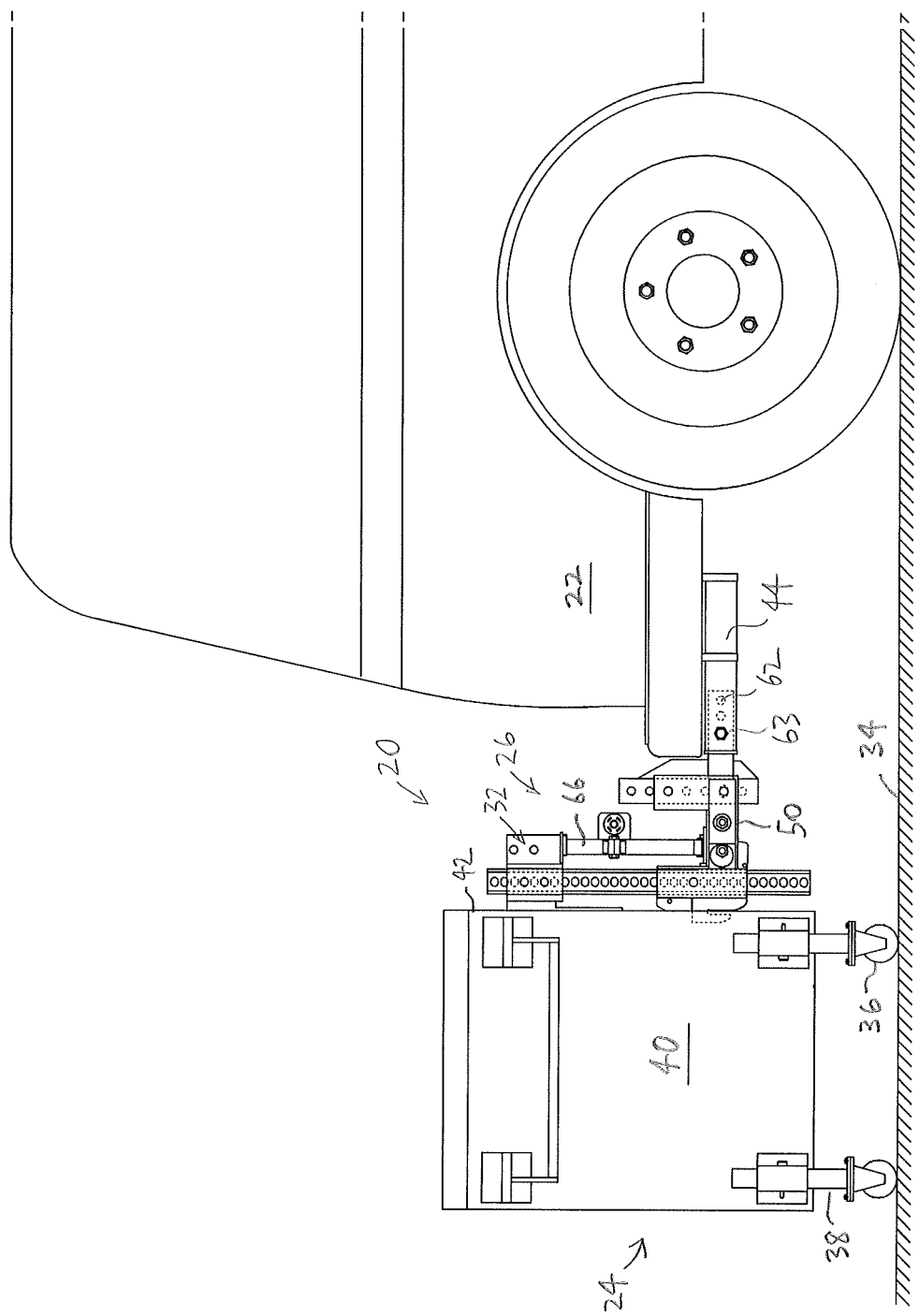
FIG. 1A is a side view of an embodiment of an auxiliary storage system of the invention mounted on a vehicle in which a storage container thereof is in a lowered position, located on a ground surface.
Figure 1B:
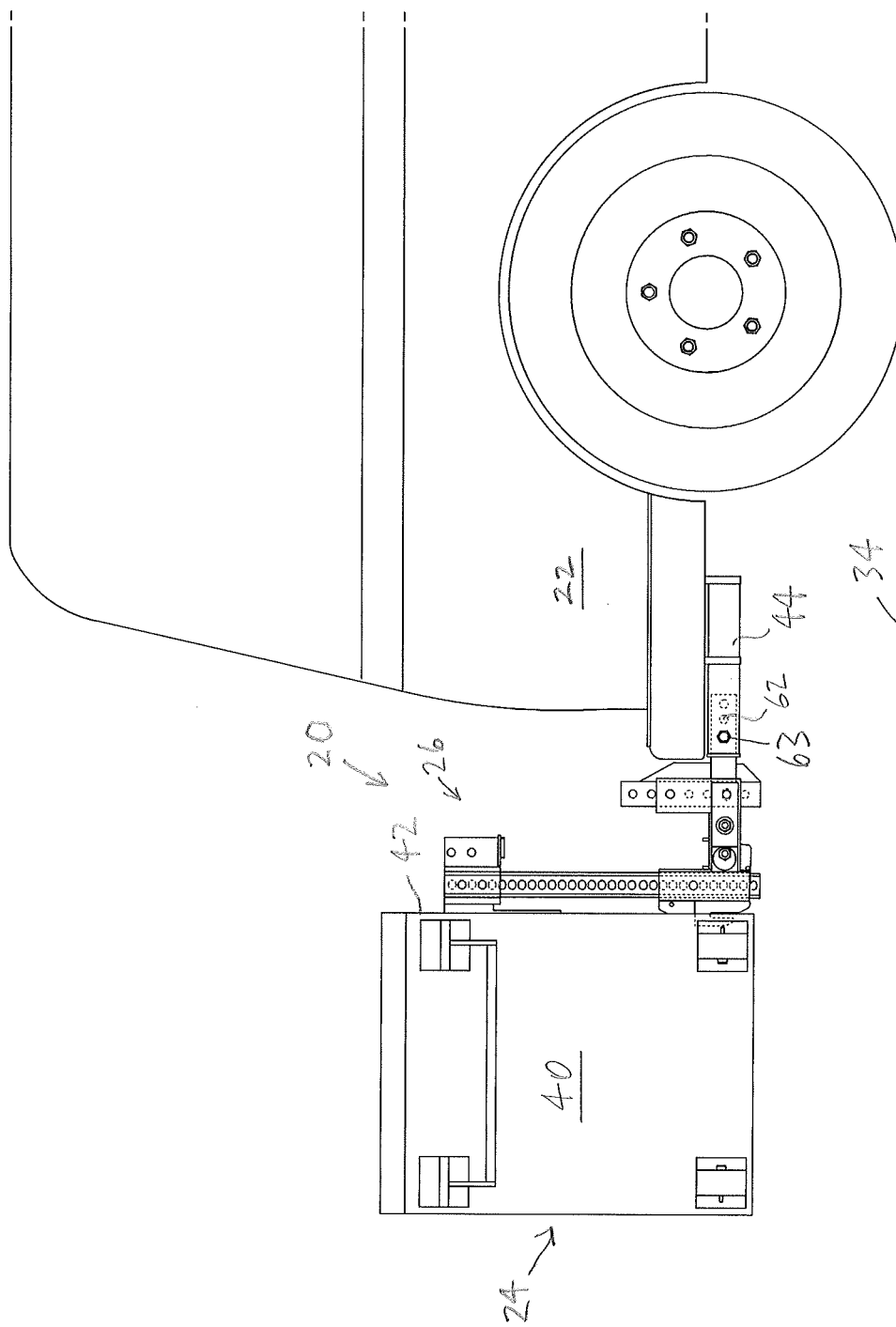
FIG. 1B is a side view of the auxiliary storage system of FIG. 1A in which the storage container is in a raised position, above the ground surface.

In the attached drawings, like reference numerals designate corresponding elements throughout. Reference is made to FIGS. 1A-9B to describe an embodiment of an auxiliary storage system of the invention referred to generally by the reference numeral 20. As can be seen in FIGS. 1A and 1B, the auxiliary storage system 20 preferably is for attachment to a vehicle 22. In one embodiment, the auxiliary storage system 20 preferably includes a storage container 24 and a hitch assembly 26 for releasably connecting the storage container 24 and the vehicle 22 together. Preferably, the hitch assembly 26 includes a central body 28 (FIG. 5A) and a first connection subassembly 30 (FIG. 2) for attaching the central body 28 and the vehicle 22 together. It is also preferred that the hitch assembly 26 includes a second connection subassembly 32 (FIGS. 3A, 3B) connectable with the storage container 24 and movable relative to the central body 28, for attaching the central body 28 and the storage container 24 together. When the second connection subassembly 32 is connected with the storage container 24, the storage container 24 is movable thereby between a raised position (FIG. 3B), in which the storage container 24 is located above a ground surface 34, and a lowered position (FIG. 1A), in which the storage container 24 is located on the ground surface 34.

As can be seen in FIG. 1A, the storage container 24 preferably includes detachable wheels or casters 36, mounted on legs 38 releasably secured to a body 40 of the storage container 24. It will be understood that, when the storage container 24 is not connected to the second connection subassembly 32, the legs 38 and casters 36 preferably are attached to the body 40, to permit the storage container 24 to be easily moved along the surface 34, as is known. Preferably, to connect the storage container 24 to the second connection subassembly 32, the storage container 24 is rolled to the hitch assembly 26 for connection, and the legs 38 and casters 36 are removed after connection thereof with the second connection subassembly 32. Also, when the storage container 24 is disconnected, the legs 38 and casters 36 preferably are attached to the body 40 before disconnection.

Those skilled in the art would appreciate that the storage container may have any suitable shape. For the purposes hereof, it is understood that the storage container's body 40 includes one or more walls 42 and that the body 40 is designed so that the walls 42 preferably are positioned substantially vertically. It will also be understood that a reference to positioning the body 40 substantially vertically includes positioning the body 40 so that the walls 42 are substantially vertical. For the purposes hereof, it will also be understood that the storage container may include devices other than box-like containers, e.g., the storage container may include platforms or other devices in or on which items may be positioned, e.g., for storage.

Figure 2:
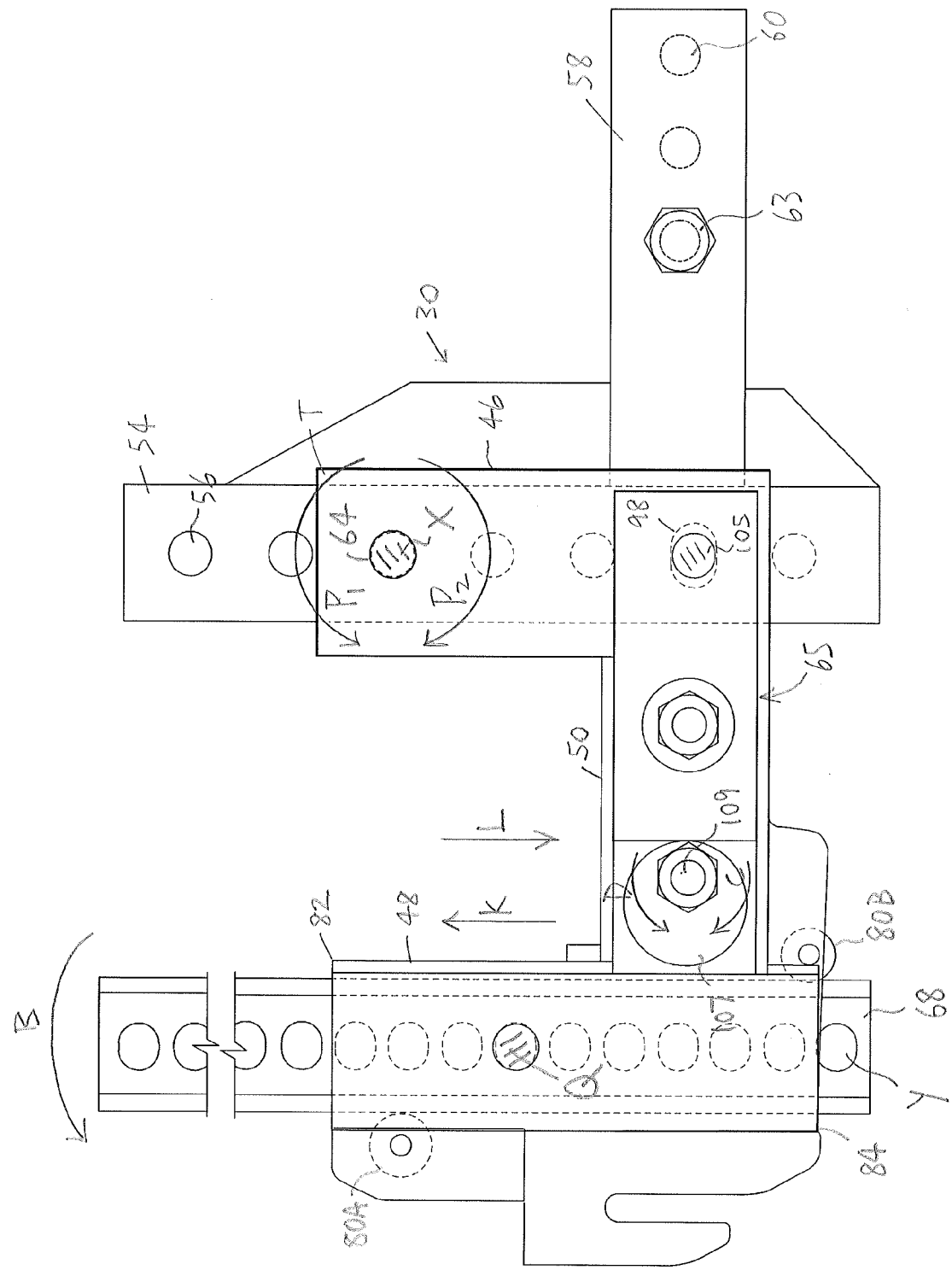
FIG. 2 is a side view of certain elements of an embodiment of a hitch assembly of the invention, drawn at a larger scale.
Figure 5A:
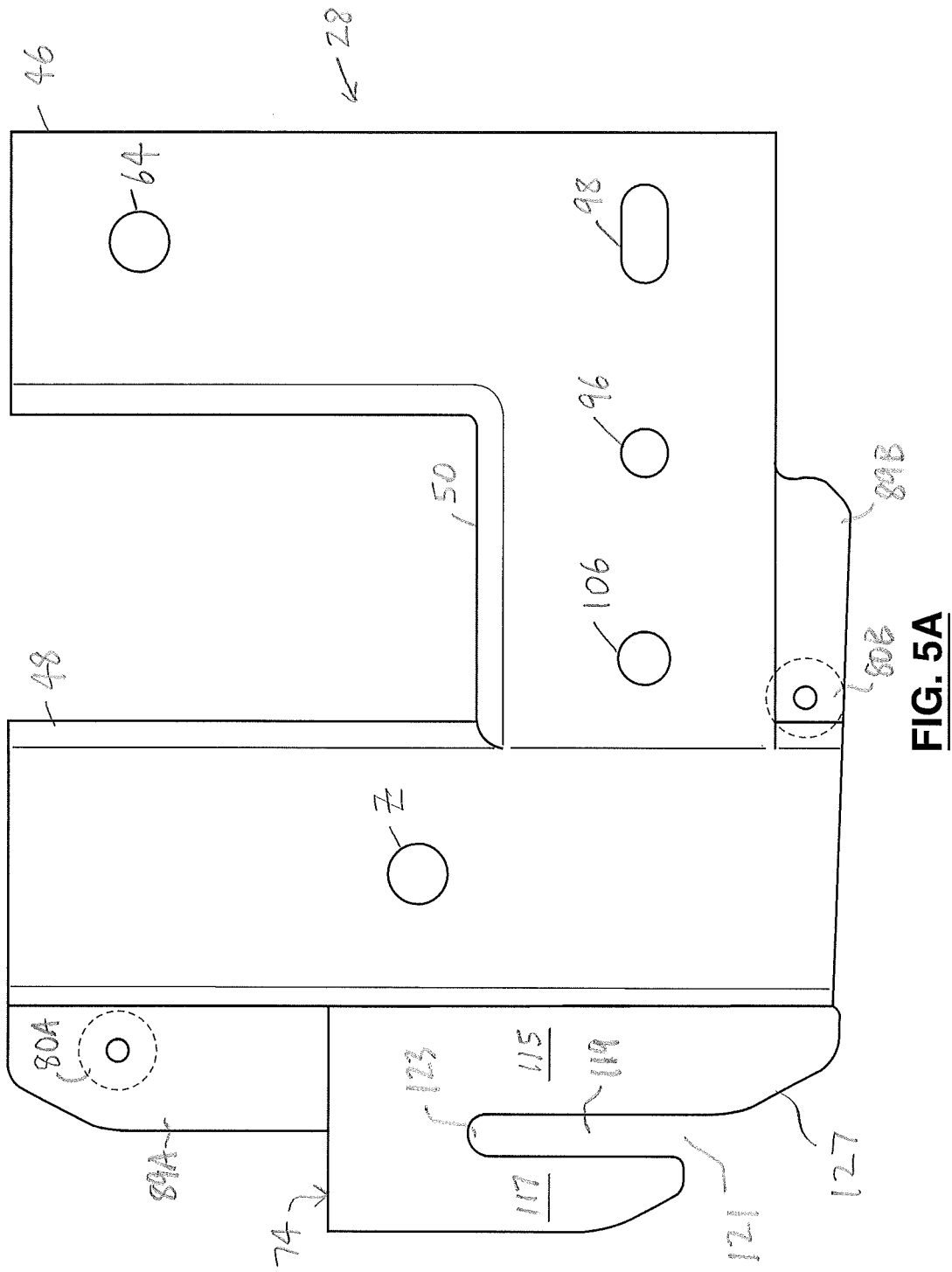
FIG. 5A is a side view of an embodiment of a central body of the invention, drawn at a larger scale.
Figure 5B:
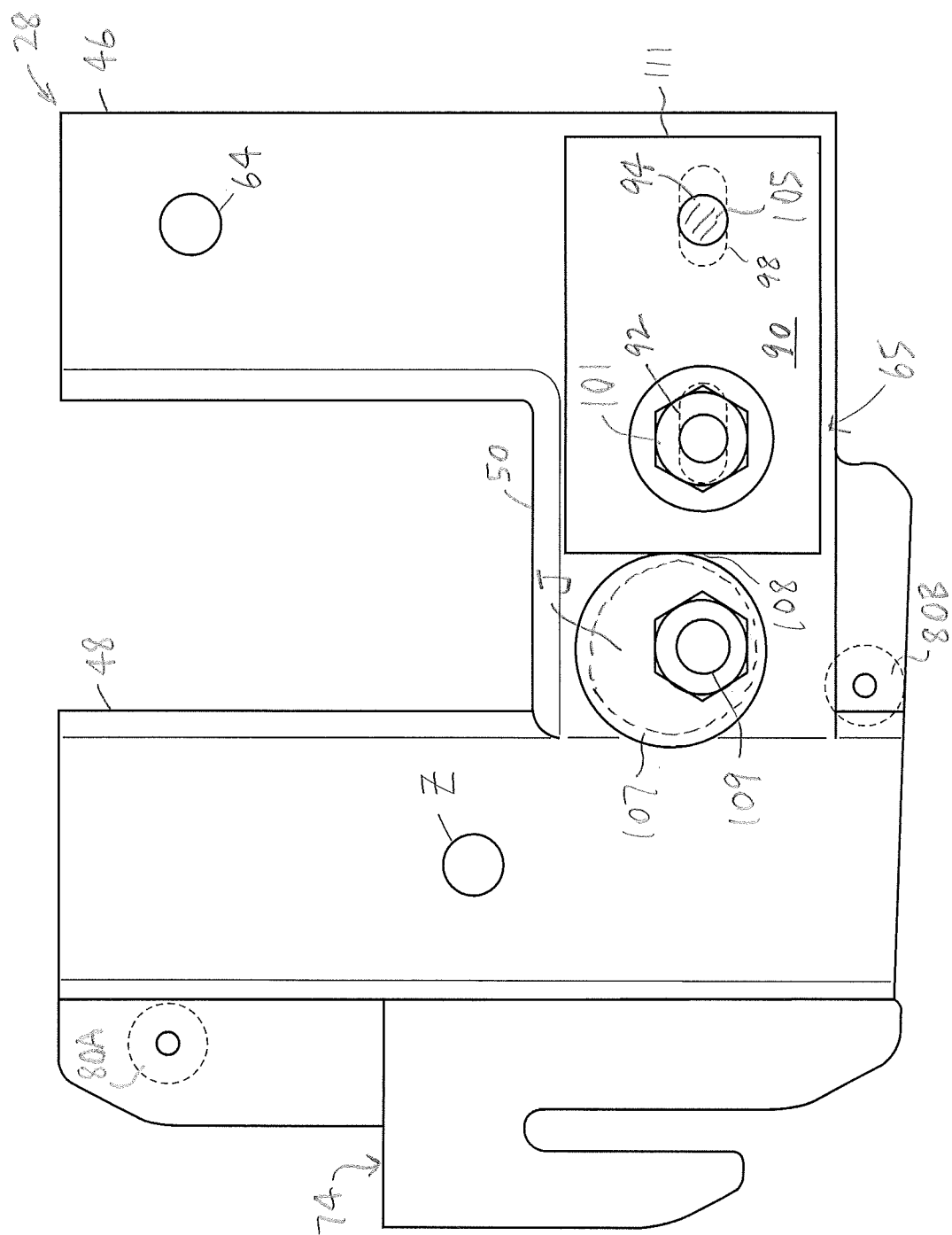
FIG. 5B is a side view of the central body of FIG. 5A with an embodiment of an adjustment plate attached thereto.

In one embodiment, and as can be seen in FIGS. 1A and 1B, the first connection subassembly 30 preferably is formed to cooperate with a trailer hitch 44 mounted to the vehicle 22. As shown in FIGS. 2, 5A, and 5B, it is preferred that the central body 28 includes a front column 46 and a rear column 48, and a connecting portion 50 extending between the front column 46 and the rear column 48. As will be described, the first connection subassembly 30 preferably is partially positionable in the front column 46, and is attachable to the central body 28 at the front column 46. The second connection subassembly 32 is at partially positionable in the rear column 48.

Figure 6A:
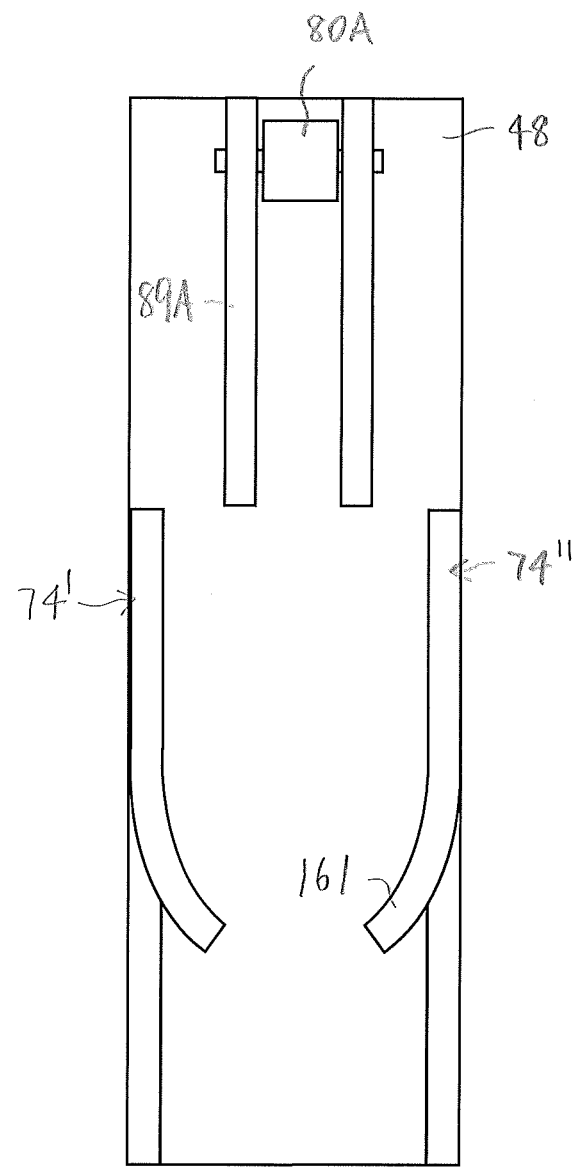
FIG. 6A is a rear view of the central body of FIG. 5A.
Figure 6B:
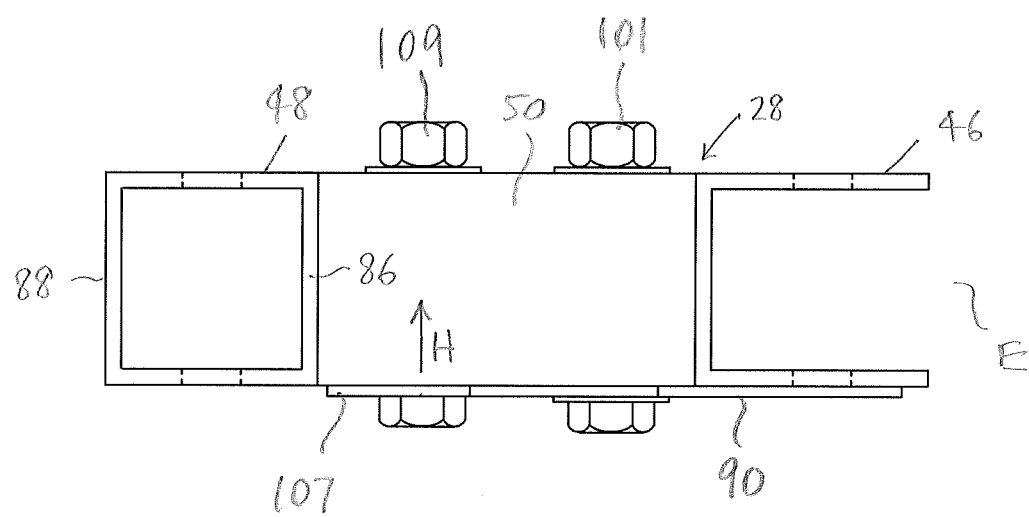
FIG. 6B is a top view of the central body and the adjustment plate of FIG. 5B.

As can be seen in FIG. 6B, the front column 46 preferably is open at its front side "E". However, the rear column 48 is enclosed.

Figure 7C:
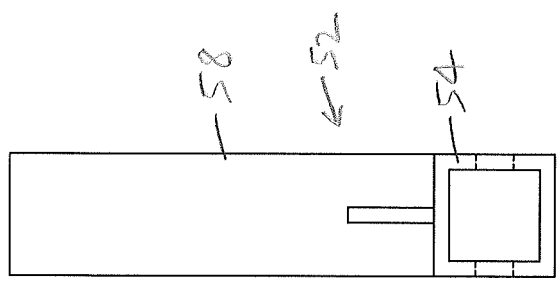
FIG. 7C is a front view of the main part of FIG. 7A.
Figure 7B:
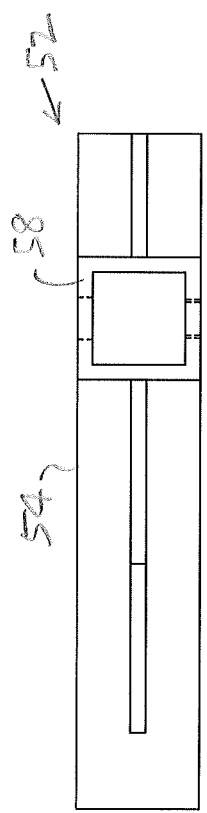
FIG. 7B is and end view of the main part of FIG. 7A.
Figure 7A:
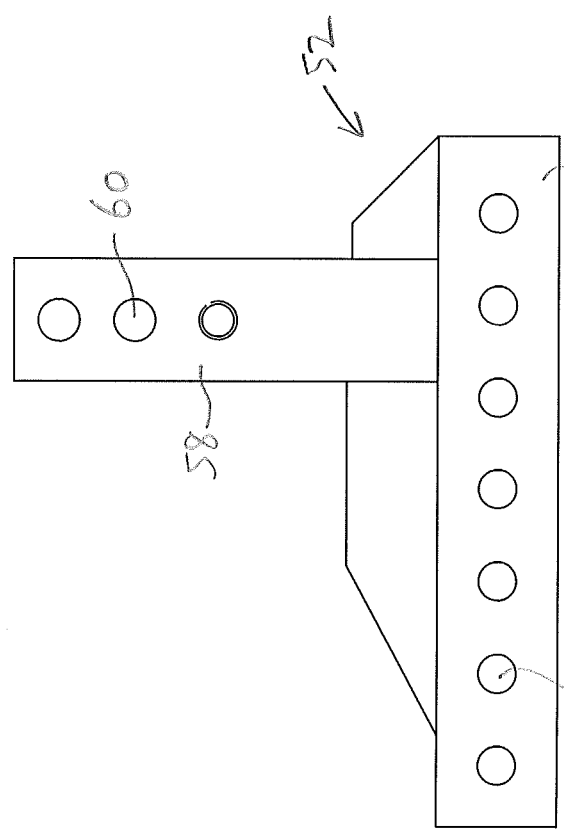
FIG. 7A is a side view of an embodiment of a main part of a first connection subassembly of the invention, drawn at a smaller scale.

In one embodiment, the first connection subassembly 30 preferably includes a connector 52 that includes an elongate main part 54 with holes 56 therein, and an elongate hitch part 58 substantially orthogonal to the main part 54 and receivable in the trailer hitch 44 (FIGS. 7A-7C). The hitch part 58 preferably also has holes 60 therein, for use in attaching the hitch part 58 and the trailer hitch 44 together.

To connect the central body 28 and the vehicle 22, the hitch part 58 preferably is positioned in the trailer hitch 44 to substantially align the holes 60 with holes 62 in the trailer hitch 44. Once substantially aligned, a fastener 63 is inserted in selected ones of the aligned holes, to secure the hitch part 58 in the trailer hitch 44. Preferably, the fastener 63 includes a bolt, a nut, and one or more washers, as is known in the art.

The central body 28 is then attached to the main part 54 of the connector 52. The central body 28 preferably is moved forwardly (i.e., in the direction indicated by arrow "A" in FIG. 2), to receive at least part of the main part 54 in the front column 46. (For clarity of illustration, the trailer hitch 44 is omitted from FIG. 2.) As can be seen in FIG. 6B, the front column 46 is open on its front side "E". This facilitates movement of the central body 28 over the main part 54, when the connector 50 is secured in the trailer hitch 44.

As can be seen in FIGS. 5A and 5B, the front column 46 preferably includes a hole 64 alignable with a selected one of the holes 56. A pin "X" preferably is inserted through the holes 64, 56 to secure the main part 54 to the central body 28. The pin "X" is secured with a retaining clip (not shown). The pin "X" attaches the main part 54 to the central body 28, but at the same time permits pivoting movement of the central body 28 about the pin, as will be described. The selected one of the holes 56 in which the pin "X" is located is in an upper region "U" of the main part 54. In this way, the first connection subassembly 30 attaches the central body 28 and the vehicle 22 together.

As will be described, the hitch assembly 26 preferably also includes an adjustment subassembly 65 (FIG. 5B) for adjusting the position of the central body 28 when it is attached to the vehicle 22, so that the central body 28 positions the second connection subassembly 32 to move the storage container 24 substantially vertically between the lowered and raised positions.

The adjustment subassembly 65 is configured for relatively fine adjustment of the vertical position of the rear column after the central body 28 is connected with the vehicle by the first connection subassembly 30. However, those skilled in the art would appreciate that, when the first connection subassembly 30 is used to attach the central body 28 and the vehicle 22 together, it is preferred that a user generally positions the central body 28 so that the rear column 48 is substantially vertical, to the extent feasible. For example, the user should avoid connecting the hitch assembly to the vehicle, and the storage container to the hitch assembly, on a surface that has a significant slope.

In one embodiment, the auxiliary storage system 20 preferably includes a motion device 66 for moving the second connection subassembly 32 relative to the central body 28 when the second connection subassembly 32 is connected with the storage container 24. The motion device 66 preferably is any suitable device. For instance, in one embodiment, the motion device 66 preferably is a jack. Any suitable jack may be used. For example, it has been found that an electric 12 volt scissor jack, model 340 NM TOQ CK RMK, available from Spec-D Tuning, of Walnut, Calif., is suitable.

Figure 3A:
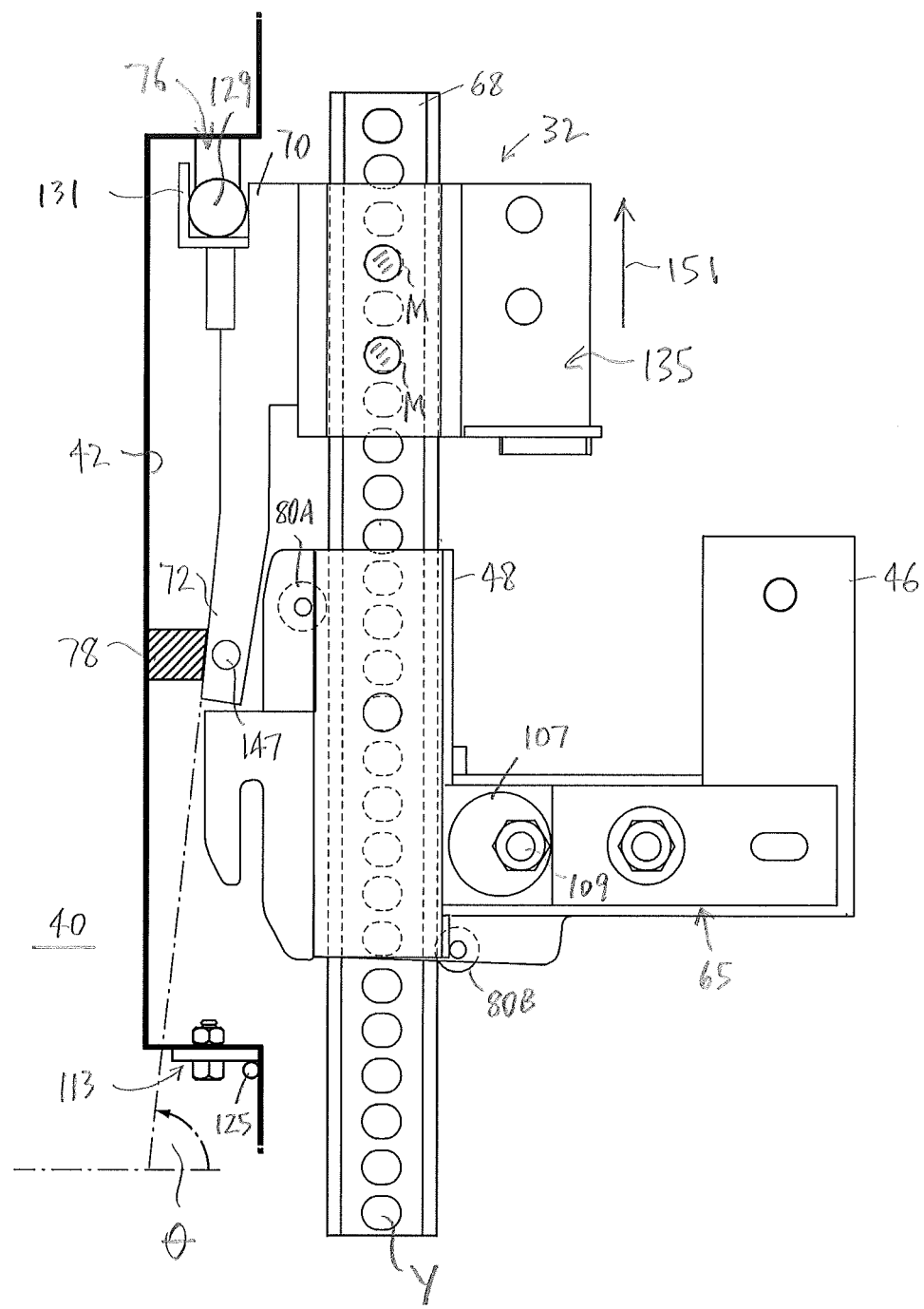
FIG. 3A is a partial cross-section of an embodiment of a second connection subassembly of the invention, and of an embodiment of the storage container of the invention, drawn at a smaller scale.
Figure 3B:
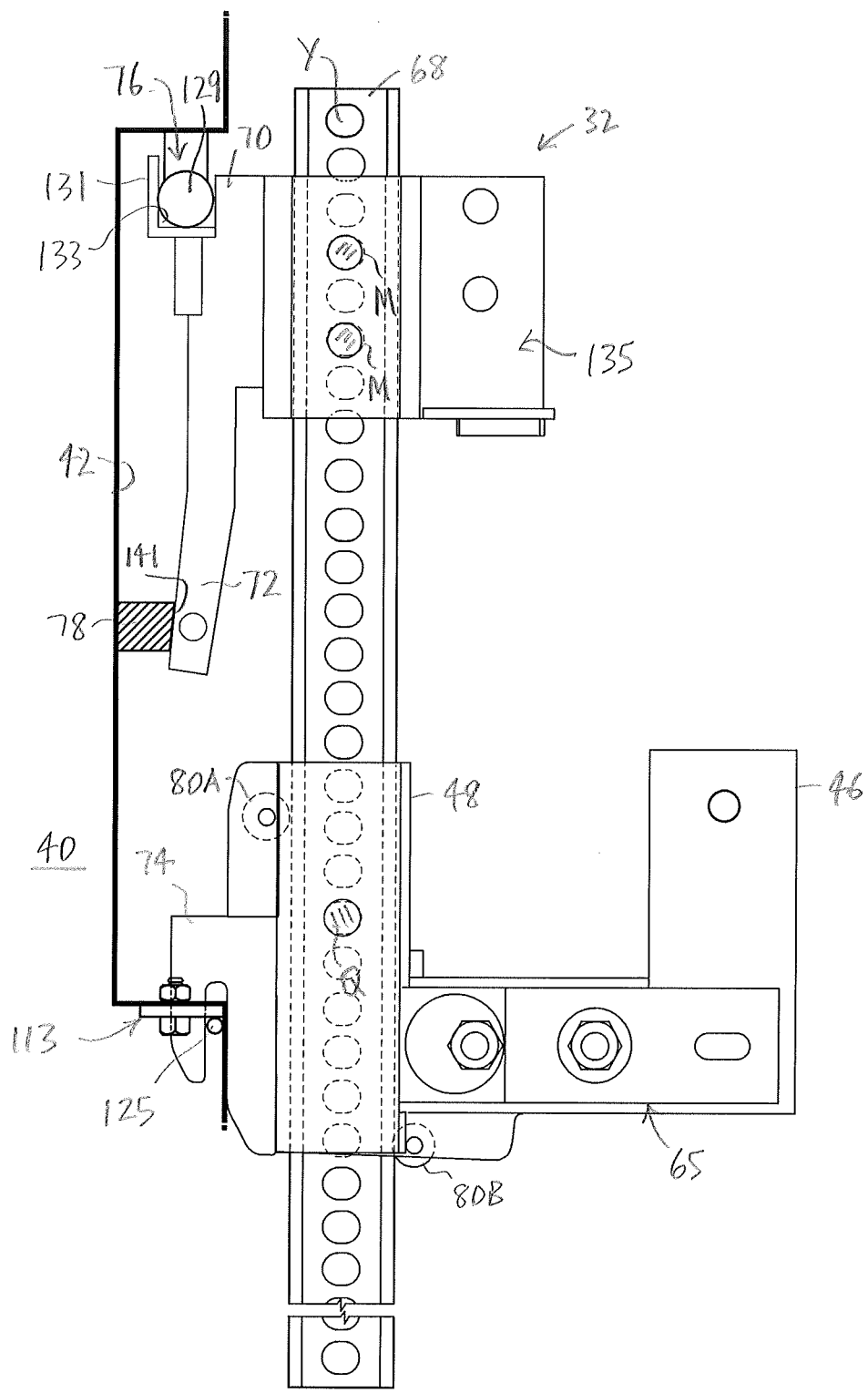
FIG. 3B is a partial cross-section of the second connection subassembly and of the storage container of FIG. 3A in which the storage container is in the raised position.

It is also preferred that the second connection subassembly 32 includes a jack element 68 mounted in the rear column 48 of the central body 28, and movable by the motion device 66 relative to the central body 28. The second connection subassembly 32 preferably also includes one or more upper engagement portions 70, and one or more middle engagement portions 72 (FIGS. 3A, 3B). As will be described, each of the upper and middle engagement portions 70, 72 preferably are mounted to the jack element 68 and engageable with the storage container 24 for moving the storage container 24 between the raised and lowered positions.

Preferably, the central body 28 additionally includes one or more lower engagement portions 74 (FIGS. 5A, 5B) mounted on the central body 28 and engageable with the storage container 24 when the storage container 24 is in the raised position, as will also be described.

It is also preferred that the storage container 24 includes one or more upper engagement elements 76, configured for engagement with the upper engagement portion 70 (FIGS. 3A, 3B). Preferably, the storage container 24 includes one or more middle engagement elements 78 positioned for engagement with the middle engagement portion 72 when the storage container 24 is in the raised position (FIG. 3B). As can be seen in FIG. 3B, when the storage container 24 is in the raised position, the middle engagement portion 72 and the middle engagement element 78 cooperate to position the storage container 24 substantially vertically.

It is also preferred that the jack element 68 is movable substantially vertically relative to the central body 28. As described above, the jack element 68 is received in the rear column 48, and the jack element 68 is also guided by the rear column 48. The central body 28 preferably is positioned by the adjustment subassembly 65 so that the rear column 48 is positioned substantially vertical, as will be described. It is believed that the motion device 66 is most effective, and the system is most stable, when the second connection assembly 32 is movable substantially vertically by the motion device 66.

As can be seen in FIGS. 2 and 3A, in one embodiment, the jack element 68 preferably is an elongate steel beam, and includes a number of jack element holes "Y" therein. The jack element 68 preferably is receivable in, and movable relative to, the rear column 48. It is also preferred that the rear column 48 includes one or more rear column holes "Z" therein (FIGS. 5A, 5B). The jack element holes "Y" preferably are alignable with the rear column hole(s) "Z". Those skilled in the art would appreciate that, once the storage container 24 has been raised to the raised position, the jack element is also in a selected raised position (FIG. 3A). At that point, a pin or bolt or other suitable fastener "Q" preferably is inserted through the rear column hole "Z" and also through the jack element hole "Y" that is aligned therewith (FIG. 2). Once so positioned, the pin or bolt "Q" then maintains the jack element 68 in its selected raised position, so that (via the second connection subassembly) the storage container 24 is thereby maintained in the raised position.

It will also be understood that the motion device 66 may be removed once the pin "Q" is inserted through the rear column hole "Z" and the jack element hole "Y" aligned therewith. Those skilled in the art would also appreciate that, when the storage container is to be moved from the raised position to the lowered position, it is preferred that the motion device 66 is first used to raise the jack element 68 slightly, to relieve the pressure to which the pin "Q" is otherwise subjected, so that the pin "Q" can easily be removed from the holes "Y" and "Z". Once the pin "Q" has been removed, the storage container 24 preferably is then lowered gradually to the lowered position, such lowering movement being controlled by the motion device 66, as is known. (It will be understood that the motion device 66 is omitted from FIGS. 2 and 3A for clarity of illustration.)

In one embodiment, the central body 28 preferably includes a number of bearings 80 to support the jack element 68 as the jack element 68 is moved by the motion device 66 relative to the central body 28. As can be seen in FIG. 2, the rear column 48 preferably extends between upper and lower ends 82, 84 thereof. In one embodiment, the rear column 48 preferably is partially defined by a front wall 86 thereof, positioned to face the vehicle 22 when the central body 28 is attached to the vehicle 22, and by a rear wall 88 thereof, positioned to face the storage container 24 when the storage container 24 is attached to the central body 28 (FIG. 6B). (It will be understood that the bearings and the lower engagement portion 74 are omitted from FIG. 6B for clarity of illustration.) Those skilled in the art would be aware that various arrangements are possible. Preferably, the bearings 80 are positioned for rolling engagement with the jack element 68 as the jack element 68 moves in the rear column 48.

Those skilled in the art would appreciate that, when the storage container 24 is attached to the central body 28 by the second connection subassembly 32 (FIGS. 3A, 3B), the weight of the storage container tends to urge the jack element 68 to pivot rearwardly (i.e., toward the storage container 24). This pivoting movement is generally indicated by arrow "B" in FIG. 2. As can be seen in FIGS. 2-3B, bearings 80A, 80B are positioned for resisting this force while the storage container 24 is raised and lowered. In one embodiment, the bearings 80 preferably include the lower bearing 80A located at the lower end 84 of the rear column 48, at least partially aligned with the front wall 86, and the upper bearing 80B located at the upper end 82 of the rear column 48, at least partially aligned with the rear wall 88. As can be seen in FIG. 5A, the bearings 80A, 80B preferably are supported by elements 89A, 89B respectively.

As can be seen in FIG. 5B, the adjustment subassembly 65 preferably includes an adjustment plate 90 having rear and front adjustment plate holes 92, 94 therein. The adjustment plate 90 preferably is positionable adjacent to the connecting portion 50 and the front column 46 of the central body 28. As illustrated in FIG. 5B, the rear adjustment plate hole 92 preferably has a generally obround shape, and the front adjustment plate hole 94 preferably has a substantially circular shape.

The central body 28 includes corresponding respective rear and front central body holes 96, 98 therein, as can be seen in FIG. 5A. The rear central body hole 96, which is located in the connecting portion 50, is substantially circular. However, the front central body hole 98, which is located in the first column 46, is substantially obround. The adjustment plate 90 is positionable adjacent to the central body 28 so that the rear and front adjustment plate holes 92, 94 are substantially aligned with the rear and front central body holes 96, 98 respectively.

The adjustment subassembly 65 preferably also includes a fastener 101 (including a bolt) positionable in the rear adjustment plate hole 92 and the rear central body hole 96. Because it is obround, the rear adjustment plate hole 92 is substantially larger than the bolt 101, to permit movement of the central body 28 relative to the bolt 101.

It is also preferred that the adjustment subassembly 65 includes a pin 105 positionable in the front adjustment plate hole 94 and the front central body hole 98 (FIG. 5B). Because it is also obround, the front central body hole 98 is substantially larger than the pin 105, to permit movement of the central body 28 relative to the adjustment plate 90.

Those skilled in the art would appreciate that, in FIGS. 2 and 5A, only one side of the central body 28 is shown. As can be seen in FIGS. 6A and 6B, the central body 28 preferably includes two substantially parallel sides thereof, and there are corresponding holes (not shown) for each of the holes in the central body shown in FIGS. 2, 5A, and 5B. Accordingly, it will be understood that a bolt or pin through any such hole passes through the corresponding hole on the other side also. In addition, and as can be seen in FIGS. 7A-7C, the connector 50 has two opposed sides thereof. It will be understood that, if a pin or bolt is inserted into a hole in one side of the connector, it is also inserted through the corresponding hole on the other side thereof.

It will also be understood that, for convenience, a reference to inserting a bolt or a pin in a hole in a side of an article will be considered to also refer to inserting the bolt or pin in the corresponding hole in the other side of the article.

From the foregoing, it can be seen that the central body 28 is movable relative to the central body 28 because of the obround holes, i.e., the rear adjustment plate hole 92, and the front central body hole 98. It can also be seen that the central body 28 is movable relative to the pin 105.

As can be seen in FIG. 2, in addition to passing through the (obround) front central body hole 98, the pin 105 also passes through an aligned one of the holes 56 in the main part 54. The aligned one of the holes 56 is substantially aligned with the front central body hole 98 and the front adjustment plate hole 94 (FIG. 2). As can be seen in FIG. 2, the aligned one of the holes 56 is located in a lower region of the main part 54.

Preferably, the pin 105 fits securely into the front adjustment plate hole 94 and in the aligned one of the holes 56 in the main part 54. As noted above, however, because the front central body hole 98 is obround, the central body 28 is movable relative to the pin 105. As will be described, the adjustment subassembly 65 permits the user to adjust the vertical position of the second column 48 once the central body 28 has been connected to the vehicle 22. The adjustment is accomplished by causing the central body 28 to pivot about the pin "X" in the directions indicated by arrows "$P_1$" and "$P_2$" in FIG. 2.

As noted above, the connector 50 is secured in the trailer hitch 44. Accordingly, the connector 50 (including the main part 54 thereof) is substantially stationary relative to the trailer hitch 44 and the vehicle 22. It will also be understood that the adjustment plate 90 is substantially stationary relative to the main part 54. This is because the adjustment plate 90 is secured to the main part 54 by the pin 105.

The main part 54 of the connector 50 is attached to the front column 46 (i.e., to the central body 28) by the pin "X", at the upper region "U" of the main part 54. It will be understood that the pin "X" attaches the upper region "U" to a top end "T" of the front column 46.

The manner in which the pivoting movement of the central body 28 relative to the main part 54 is accomplished is as follows. As can be seen in FIG. 5A, the central body 28 preferably includes an adjustment bolt hole 106, located in the connecting portion 50, and positioned rearwardly of the rear central body hole 96. As shown in FIG. 5B, the adjustment subassembly 65 preferably also includes an eccentric washer 107 movable by rotation of an adjustment bolt 109 that is mounted in the adjustment bolt hole 106.

The adjustment bolt 109 preferably is rotatable in the adjustment bolt hole 106 to cause eccentric rotation of the eccentric washer 107. Preferably, the washer 107 is engaged with the central body 28 because the bolt 109 presses the washer 107 against the central body 28, i.e., in the direction indicated by arrow "H" in FIG. 6B. It will be understood also that, due to the generally circular shape of the eccentric washer 107, it engages the central body 28 over a generally circular area that is centered on the bolt 109. A schematic area is illustrated in FIG. 5B, and referred to by "J". Those skilled in the art would appreciate that the actual area of the central body 28 engaged by the washer 107 in this way may vary. Because the washer 107 is eccentric, its rotation urges the part of the body 28 engaged by the washer 107 to move along an arc generally defined by the direction of rotation of the bolt 109.

The eccentric washer 107 is also at least partially engaged with a rear part 108 of the adjustment plate 90 (FIG. 5B). As described above, the adjustment plate 90 is substantially stationary relative to the main part 54. Accordingly, so that eccentric rotation of the washer 107 causes corresponding movement of the central body 28 relative to the adjustment plate 90, and also relative to the main part 54. The corresponding movement is pivoting movement of the central body 28 about the pin "X". The central body 28 is pivotable about the pin "X" in response to the rotation of the eccentric washer 107 about the adjustment bolt 109.

For example, clockwise rotation of the adjustment bolt 109 (i.e., in the direction indicated by arrow "C" in FIG. 2) causes the eccentric washer 107 to urge the rear column 48 to pivot upwardly (i.e., in the direction generally indicated by arrow "K" in FIG. 2). This pivoting movement is about the pin "X" and in the direction of arrow "$P_1$" in FIG. 2. Similarly, counterclockwise rotation of the adjustment bolt 109 (i.e., in the direction indicated by arrow "D" in FIG. 2) causes the eccentric washer 107 to urge the rear column 48 to pivot downwardly (i.e., in the direction generally indicated by arrow "L" in FIG. 2). This pivoting movement is about the pin "X" and in the direction indicated by arrow "$P_2$" in FIG. 2.

Based on the foregoing, it can be seen that the adjustment subassembly 65 may be used to effect relatively fine adjustments of the position of the rear column 46, to position the rear column 48 substantially vertically. For instance, with a carpenter's level or other suitable device, the user may use the adjustment subassembly 65 to position the rear column 48 substantially vertically with some accuracy.

Figure 4:
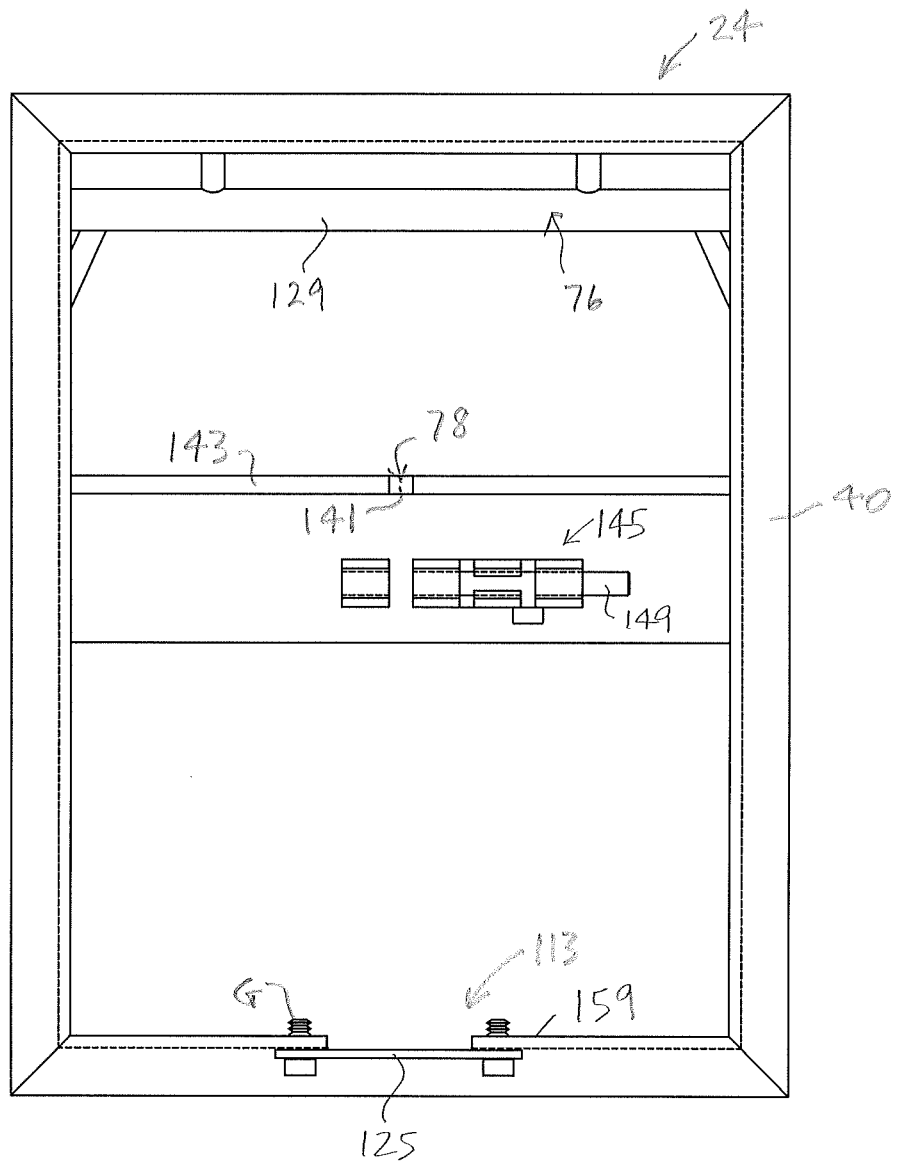
FIG. 4 is a front view of the storage container of FIGS. 3A and 3B, drawn at a smaller scale.

As can be seen in FIG. 4, in one embodiment, the storage container 24 additionally includes a lower engagement element 113 positioned below the middle engagement element 78. Preferably, the lower engagement portion 74 is formed for engagement with the lower engagement element 113 when the storage container 24 is in the raised position, so that the storage container is at least partially stabilized by the lower engagement portion 74. When the storage container 24 is in the raised position, the lower engagement portion substantially prevents the storage container from swaying (i.e., moving at its lower end from side to side). The lower engagement portion 74 also acts as a brake, preventing further upward movement of the storage container 24 once it has reached the raised position.

As can be seen in FIG. 5A, in one embodiment, the lower engagement portion 74 preferably includes an inner part 115 secured to the rear column 48. The lower engagement portion 74 preferably includes an outer part 117 at least partially separated from the inner part 115 to define a slot 119 therebetween extending between an open lower end 121 and a closed upper end 123. Preferably, the lower engagement element 113 is at least partially receivable in the slot 119, and engageable with the lower engagement portion 74 at the upper end 123 of the slot 119 when the storage container 24 is in the raised position. Those skilled in the art would be aware that the lower engagement element 113 may be provided in various forms. As will be described, the lower engagement element 113 preferably includes a bar 125 spaced apart from the body 40 of the storage container 24.

In one embodiment, it is also preferred that the inner part 115 includes a chamfer region 127 formed to guide the lower engagement portion 74 to receive the bar 125 in the slot 119.

As can be seen in FIG. 6A, in one embodiment, two lower engagement portions preferably are provided, located parallel to each other. In FIG. 6A, the lower engagement portions are identified for convenience as 74' and 74". As can be seen in FIG. 6A, in one embodiment, a lower segment 161 of the outer part 117 preferably is curved slightly inwardly. The lower segments 161 preferably are curvilinear so that the lower engagement portion will be more likely to stay engaged to the lower engagement element 113.

In use, with the first connection subassembly 30, the central body 28 preferably is attached to the vehicle 22, as described above. Next, the position of the central body 28 relative to the vehicle 22 (i.e., relative to the trailer hitch 44) is adjusted, with the adjustment subassembly 65, to position the rear column 48 substantially vertically, as described above.

The motion device 66 preferably is engaged with the second connection subassembly 32, for moving the second connection subassembly 32 substantially vertically relative to the central body 28. It is preferred that, next, the upper engagement portion 70 engages the upper engagement element 76. The upper engagement element 76 preferably includes a substantially cylindrical rod 129 (FIG. 4) mounted generally horizontally on the body 40 of the storage container 24. As can be seen in FIGS. 3A and 3B, the upper engagement portion 70 preferably includes a cradle or receiver 131 with a channel 133 preferably at least partially defined therein, in which the rod 129 is receivable. The rod 129 preferably is mounted on the body 40 so that it is easily engaged by the cradle 131 when the cradle 131 is moved upwardly by the motion means 66.

Figure 8A:
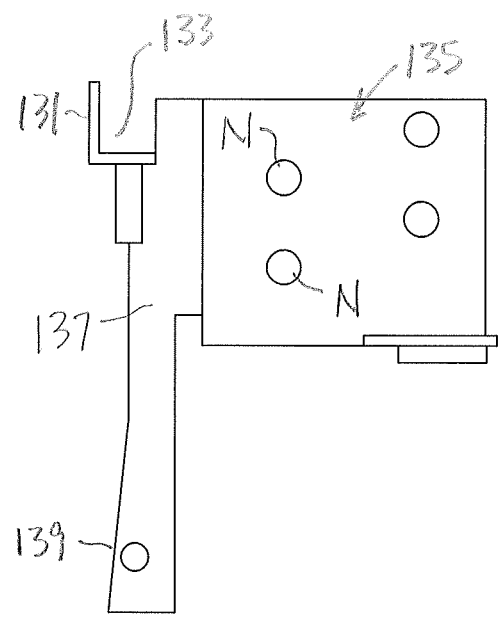
FIG. 8A is a side view of an embodiment of a primary part of a second connection subassembly of the invention, drawn at a smaller scale.
Figure 8B:
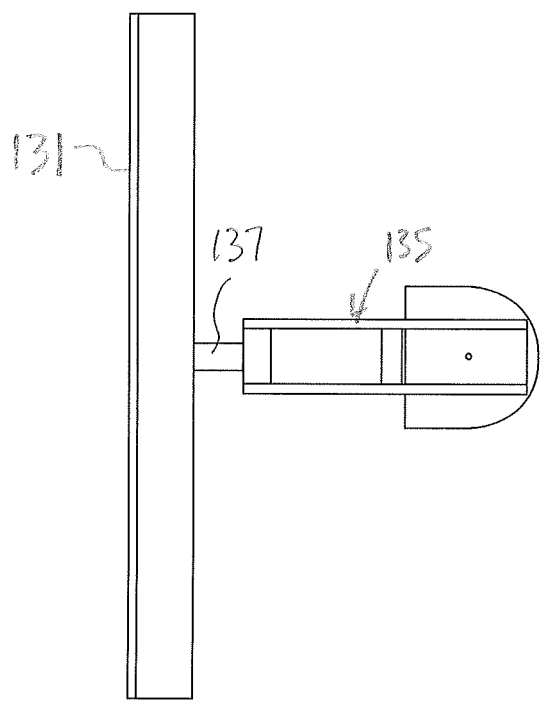
FIG. 8B is a top view of the primary part of FIG. 8A.

As can be seen in FIGS. 8A and 8B, the second connection subassembly 32 preferably includes a yoke 135 mountable to the jack element 68, and a body element 137 that connects the yoke 135 and the upper and middle engagement portions 70, 72. It is also preferred that the yoke 135 and the jack element 68 are secured together by one or more pins "M" that are inserted through holes "N" in the yoke 135 (FIG. 8A) and aligned ones of the holes "Y" in the jack element 68.

Preferably, the middle engagement portion 72 includes a first face area 139 (FIG. 8A) that is formed to define a predetermined angle θ relative to the horizontal (FIG. 3A), when the yoke 135 is secured to the jack element 68, and the jack element 68 is positioned substantially vertical. As can be seen in FIG. 3B, the face area 139 preferably is formed to cooperate with the middle engagement element 72 to position the walls 42 of the body 40 substantially vertically. In one embodiment, the middle engagement element 72 preferably includes a second face area 141 that is positioned at approximately 180°–θ (FIGS. 3A, 3B). Also the face area 139 preferably extends upwardly on the body element 137 so that, as the upper engagement portion 70 is raised to engage the upper engagement element 76, the second face area 141 slidably engages the first face area 139. Preferably, the second face area 141 is recessed in a bar 143 on the body 40 (FIG. 4).

Those skilled in the art would appreciate that, after the upper engagement portion 70 and the upper engagement element 76 are engaged, the motion device 66 preferably lifts the second connection subassembly 32 and the storage container 24 engaged thereby, as indicated by arrow 151 in FIG. 3A. (The motion device 66 is omitted from FIG. 3A for clarity of illustration.) The stationary lower engagement portion 74 is engaged by the lower engagement element 113 as the storage container is raised, relative to the central body 28. The bar 125 preferably is guided into the slot 119 by the chamfer region 127.

As can be seen in FIG. 4, in one embodiment, the storage container 24 includes a locking mechanism 145 for securing the middle engagement portion 72 to the body 40. Those skilled in the art would appreciate that various arrangements are possible. In one embodiment, the middle engagement portion 72 preferably includes a bore 147 in which a latch element 149 is receivable. For instance, the latch element 149 may be in the form of a sliding bolt mechanism (FIG. 4). Preferably, when the storage container 24 is in the raised position and the first and second face areas 139, 141 are engaged, the latch element 149 is moved into the bore 147, and held therein by any suitable means.

Once the storage container is in the raised position, one or more pins or bolts "Q" are positioned in the holes "Z" in the second column 48 and through the holes "Y" in the jack element 68, to hold the jack element 68 in position. At this point, the motion device may be removed. Those skilled in the art would appreciate that the motion device 66 preferably is also used to lower the storage container 24 to the lowered position, as will be described.

As can be seen in FIG. 3A, the storage container 24 is raised (i.e., moved in the direction indicated by arrow 151) until the lower engagement portion 74 engages the bar 125. At that point, the storage container 24 is in the raised position. It will be understood that the lower engagement portion 74 prevents the storage container, when it is in the raised position and the vehicle is moving, from swaying from side to side. In addition, the lower engagement portion 74 acts as a stop when the storage container 24 is being raised, i.e., so that the jack element 68 is not raised so far as to run out of the rear column.

Figure 9A:
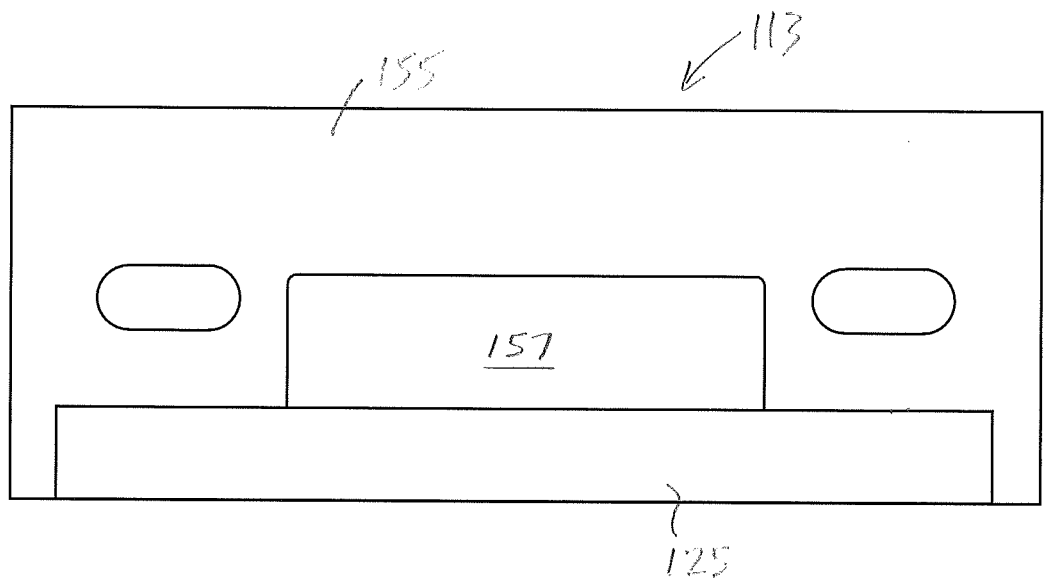
FIG. 9A is a top view of an embodiment of a lower engagement element of the invention, drawn at a larger scale.
Figure 9B:
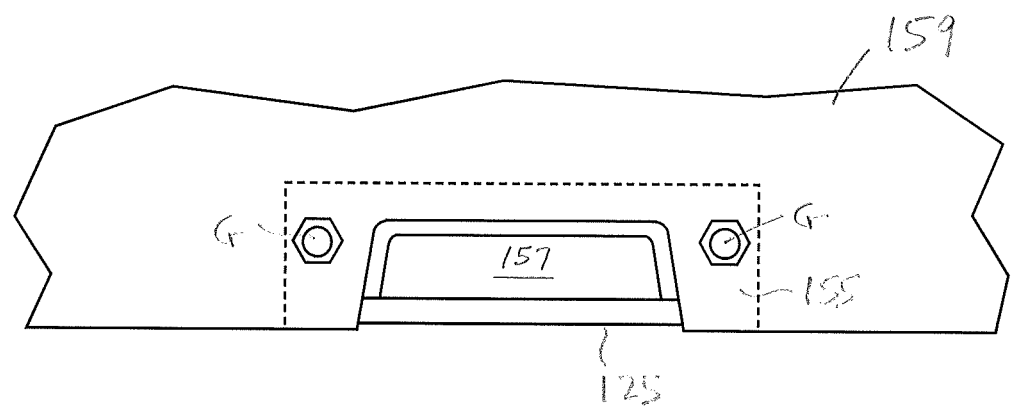
FIG. 9B is a top view of the lower engagement element of FIG. 9A mounted on the storage container, drawn at a smaller scale.

As can be seen in FIGS. 9A and 9B, the lower engagement element 113 preferably includes a plate 155 with an aperture 157 therein. The bar 125 preferably is positioned adjacent to the aperture 157. In one embodiment, the storage container 24 preferably includes a ledge 159 on the wall 42 (FIGS. 3A, 3B), to which the lower engagement element 113 is mounted (FIGS. 4, 9B). It is preferred that the lower engagement element 113 is relatively easily removable from the ledge in order that, in case of excessive wear of the bar 125, it can expeditiously be replaced. As can be seen in FIG. 9B, for example, the lower engagement element 113 preferably is secured to the ledge 159 by suitable fasteners "G".

In order to lower the storage container to the lowered position, the legs 38 and wheels or casters 36 preferably are attached to the box. The latch element 149 is removed from the bore. The motion device 66 is used to raise the second connection subassembly 32 a small distance, so that the pin "Q" is not subject to pressure, and can easily be removed. At that point, the motion device 66 preferably is then used to lower the storage container 24 to the lowered position. The second connection subassembly 32 is then disconnected from the storage container 24.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. An auxiliary storage system for attachment to a vehicle, the auxiliary storage system comprising:
    a storage container;
    a hitch assembly for releasably connecting the storage container and the vehicle together, the hitch assembly comprising:
        a central body;
        a first connection subassembly for attaching the central body and the vehicle together;
        a second connection subassembly connectable with the storage container and movable relative to the central body, for attaching the central body and the storage container together;
        when the second connection subassembly is connected with the storage container, the storage container is movable thereby between a raised position, in which the storage container is located above a ground surface, and a lowered position, in which the storage container is located on the ground surface;
    a motion device for moving the second connection subassembly relative to the central body when the second connection subassembly is connected with the storage container;
    the second connection subassembly comprising:
        a jack element mounted in a rear column of the central body, and movable by the motion device relative to the central body;
        at least one upper engagement portion;
        at least one middle engagement portion;
        each of said at least one upper engagement portion and said at least one middle engagement portion being mounted to the jack element and engageable with the storage container for moving the storage container between the raised and lowered positions; and
    the central body additionally comprising at least one lower engagement portion mounted on the central body and engageable with the storage container when the storage container is in the raised position.

2. An auxiliary storage system according to claim 1 in which the jack element is movable substantially vertically relative to the central body.

3. An auxiliary storage system according to claim 2 in which the storage container comprises at least one upper engagement element, configured for engagement with said at least one upper engagement portion.

4. An auxiliary storage system according to claim 3 in which:
    the storage container comprises at least one middle engagement element positioned for engagement with said at least one middle engagement portion when the storage container is in the raised position; and
    when the storage container is in the raised position, said at least one middle engagement portion and said at least one middle engagement element cooperate to position the storage container substantially vertically.

5. An auxiliary storage system according to claim 3 in which the central body comprises a plurality of bearings to support the jack element as the jack element is moved by the motion device relative to the central body.

6. An auxiliary storage system according to claim 5 in which:
    the rear column extends between upper and lower ends thereof;
    the rear column is partially defined by a front wall thereof, positioned to face the vehicle when the central body is attached to the vehicle, and by a rear wall thereof, positioned to face the storage container when the storage container is attached to the central body;
    the bearings are positioned for rolling engagement with the jack element as the jack element moves in the rear column, the bearings comprise:
        a lower bearing located at the lower end of the rear column, substantially aligned with the front wall; and
        an upper bearing located at the upper end of the rear column, substantially aligned with the rear wall.

7. An auxiliary storage system according to claim 1 in which the hitch assembly additionally comprises an adjustment subassembly for adjusting the position of the central body when it is attached to the vehicle, such that the central body positions the second connection subassembly to move the storage container substantially vertically between the lowered and raised positions;
    the adjustment subassembly comprising:
        an adjustment plate comprising rear and front adjustment plate holes therein;
        the adjustment plate being positionable adjacent to a selected part of the central body comprising respective rear and front central body holes therein, for alignment of the rear adjustment plate hole and the front adjustment plate hole substantially with the rear and front central body holes respectively;

a bolt positionable in the rear adjustment plate hole and the rear central body hole, the rear adjustment plate hole being substantially larger than the bolt, to permit movement of the central body relative to the adjustment plate;

a pin positionable in the front adjustment plate hole and the front central body hole, the front central body hole being substantially larger than the pin, to permit movement of the central body relative to the adjustment plate; and an eccentric washer movable by rotation of an adjustment bolt, the eccentric washer being engaged with the central body and at least partially engaged with the adjustment plate such that rotation of the eccentric washer causes corresponding pivoting movement of the central body relative to the adjustment plate, for positioning a rear column of the central body substantially vertically.

8. An auxiliary storage system according to claim 7 in which:

the first connection subassembly comprises a connector securable to the vehicle, the connector comprising a main part receivable in a front column of the central body;

an upper region of the main part being attached to the first column by a pin; and the central body is pivotable about the pin in response to the rotation of the eccentric washer.

9. An auxiliary storage system according to claim 4 in which:

the storage container additionally comprises a lower engagement element positioned below the middle engagement element; and said at least one lower engagement portion is formed for engagement with the lower engagement element when the storage container is in the raised position, such that the storage container is at least partially stabilized by said at least one engagement portion.

10. An auxiliary storage system according to claim 9 in which said at least one lower engagement portion comprises:

an inner part secured to the rear column;

an outer part at least partially separated from the inner part to define a slot therebetween extending between an open lower end and a closed upper end; and the lower engagement element being at least partially receivable in the slot, and engageable with the lower engagement portion at the upper end of the slot when the storage container is in the raised position.

11. An auxiliary storage system according to claim 10 in which the inner part comprises a chamfer region formed to guide the lower engagement portion to receive the bar in the slot.

12. An auxiliary storage system according to claim 1 in which:

the second connection subassembly is movable substantially vertically relative to the central body, the second connection subassembly comprising:

at least one upper engagement portion;

at least one middle engagement portion;

the storage container comprises:

at least one upper engagement element for engagement with said at least one upper engagement portion, to enable the second connection subassembly to at least partially support the storage container above the ground surface;

at least one middle engagement element for engagement with said at least one middle engagement portion, to stabilize the storage container when said at least one upper element and said at least one upper engagement portion are engaged; and the storage container additionally comprising a lower engagement element engageable with the central body, for further stabilizing the storage container when the storage container is in the raised position.

13. An auxiliary storage system according to claim 12 in which the central body additionally comprises at least one lower engagement portion engageable with the lower engagement element when the storage container is in the raised position.

* * * * *